(12) United States Patent
Ghani et al.

(10) Patent No.: US 8,620,836 B2
(45) Date of Patent: Dec. 31, 2013

(54) PREPROCESSING OF TEXT

(75) Inventors: Rayid Ghani, Chicago, IL (US); Chad Cumby, Chicago, IL (US); Marko Krema, Evanston, IL (US)

(73) Assignee: Accenture Global Services Limited, Dublin (IE)

( * ) Notice: Subject to any disclaimer, the term of this patent is extended or adjusted under 35 U.S.C. 154(b) by 287 days.

(21) Appl. No.: 12/987,469

(22) Filed: Jan. 10, 2011

(65) Prior Publication Data

US 2012/0179453 A1    Jul. 12, 2012

(51) Int. Cl.
*G06F 15/18* (2006.01)

(52) U.S. Cl.
USPC .......................................................... 706/12

(58) Field of Classification Search
USPC .......................................................... 703/12
See application file for complete search history.

(56) References Cited

U.S. PATENT DOCUMENTS

| | | | |
|---|---|---|---|
| 5,146,406 A | 9/1992 | Jensen | |
| 5,943,670 A | 8/1999 | Prager | |
| 6,112,168 A * | 8/2000 | Corston et al. | 704/9 |
| 6,240,409 B1 * | 5/2001 | Aiken | 1/1 |
| 6,338,033 B1 * | 1/2002 | Bourbonnais et al. | 704/3 |
| 6,405,175 B1 | 6/2002 | Ng | |
| 6,668,254 B2 | 12/2003 | Matson | |
| 6,714,939 B2 | 3/2004 | Saldana | |
| 6,785,671 B1 | 8/2004 | Bailey | |
| 6,804,659 B1 | 10/2004 | Graham et al. | |
| 6,957,213 B1 * | 10/2005 | Yuret | 707/711 |
| 6,986,104 B2 | 1/2006 | Green et al. | |
| 7,020,662 B2 | 3/2006 | Boreham et al. | |
| 7,043,420 B2 | 5/2006 | Ratnaparkhi | |
| 7,043,492 B1 | 5/2006 | Neal et al. | |
| 7,249,162 B2 * | 7/2007 | Rounthwaite et al. | 709/206 |
| 7,567,976 B1 | 7/2009 | Betz et al. | |
| 7,818,308 B2 * | 10/2010 | Carus et al. | 707/705 |
| 7,970,767 B2 | 6/2011 | Probst et al. | |
| 7,996,440 B2 | 8/2011 | Probst et al. | |
| 8,027,941 B2 | 9/2011 | Probst et al. | |
| 2002/0107861 A1 | 8/2002 | Clendinning et al. | |
| 2002/0111863 A1 | 8/2002 | Landesman | |
| 2002/0133479 A1 | 9/2002 | Dippold | |
| 2002/0142277 A1 | 10/2002 | Burstein et al. | |

(Continued)

OTHER PUBLICATIONS

Text Mining with Information Extraction Un Yong Nahm and Raymond J. Mooney.*

(Continued)

*Primary Examiner* — Kakali Chaki
*Assistant Examiner* — Ababacar Seck
(74) *Attorney, Agent, or Firm* — Harrity & Harrity, LLP

(57) ABSTRACT

Performance of statistical machine learning techniques, particularly classification techniques applied to the extraction of attributes and values concerning products, is improved by preprocessing a body of text to be analyzed to remove extraneous information. The body of text is split into a plurality of segments. In an embodiment, sentence identification criteria are applied to identify sentences as the plurality of segments. Thereafter, the plurality of segments are clustered to provide a plurality of clusters. One or more of the resulting clusters are then analyzed to identify segments having low relevance to their respective clusters. Such low relevance segments are then removed from their respective clusters and, consequently, from the body of text. As the resulting relevance-filtered body of text no longer includes portions of the body of text containing mostly extraneous information, the reliability of any subsequent statistical machine learning techniques may be improved.

21 Claims, 4 Drawing Sheets

(56) References Cited

U.S. PATENT DOCUMENTS

| | | | | |
|---|---|---|---|---|
| 2009/0154693 | A1* | 6/2009 | Nakamura | 380/30 |
| 2009/0306962 | A1* | 12/2009 | Harlow et al. | 704/9 |
| 2012/0179633 | A1 | 7/2012 | Ghani et al. | |

OTHER PUBLICATIONS

Transductive Inference for Text Classification using Support Vector Machines Thorsten .Joachims.*

Songfeng, "Unsupervised Clustering Based Reduced Support Vector Machines" IEEE 2003, pp. 821-824.

Guha, "A Clustering Algorithm for Categorical Attributes", Elsevier, 2000, pp. 1-24.

Nauman, "Declarative Data Mining with Conflict Resolution", IBM, 2002, pp. 1-13.

Ghani, "Mining the Web to Add Semantics to Retail Data Mining", Springer, 2004, pp. 43-56.

Ester, "A Density-Based Algorithm for Discovering Clusters in Large Spatial Databases with Noise", AAI, 1996, pp. 226-231.

Dempster, A.P., et al., "Maximum Likelihood from Incomplete Data via the EM Algorithm", Journal of Royal Statistical Society, Series B, 39 (1):1-38, 1977.

Agrawal, R., et al., "Fast Discovery of Association Rules", in U. Fayyad et al., editors, Advances in Knowledge Discovery and Data Mining, AAAI Press/ The MIT Press, pp. 307-328, 1996.

Jaakkolda, T., et al., "Exploiting Generative Models in Discriminative Classifiers", In Advances in NIPS, 1999.

Lewis, D.D., "Naive (Bayes) at Forty: The Independence Assumption in Information Retrieval", in Machine Learning ECML-98, Tenth European Conference on Machine Learning, pp. 4-15, 1998.

Nahm, U.Y., et al., "Text Mining with Information Extraction", in AAAI 2002 Spring Symposium on Mining Answers from Texts and Knowledge Bases, 2002.

McCallum & K. Nigam, "A Comparison of Event Models for Naive Bayes Text Classification", in Learning for Text Categorization: Papers from the AAAI Workshop, apges 41-48, 1998. Tech. Rep. WS 98-05, AAAI Press.

Ghani, R., et al., "Data Mining on Symbolic Knowledge Extraction from the Web," in Workshop of Text Mining at the Sixth ACM SIGKDD International Conference on Knowledge Discovery and Data Mining.

Joachim, T., "Transductive Inference for Text Classification Using Support Vector Machines", In Machine Learning: Proceedings of the Sixteenth International Conference, 1999.

Craven, M., et al., "Learning to Construct Knowledge Bases from the World Wide Web", Artificial Intelligence, 118 (1-2): 69-114, 2000.

Schafer, J. Ben, et al., "E-Commerce Recommendation Applications", GroupLens Research Project, Department of Computer Science and Engineering, University of Minnesota, 2001.

Ghani R. and A. Fano, "Building Recommender Systems using a Knowledge base of Product Semantics", Accenture Technology Labs, Chicago, IL , 2002.

Lin, D., "Dependency-Based Evaluation of Minipar", Department of Computer Science, University of Alberta, Edmonton, Alberta, Canada 1998.

Porter, M.F., "An Algorithm for Suffix Stripping", Program, 14 No. 3, pp. 130-137, Jul. 1980.

Nigam, et al., "Text Classification from Labeled and Unlabeled Documents using EM", Machine Learning 1-34, Kluwer Academic Publishers, Boston, Manufactured in the Netherlands, vol. 39 Issue 2-3, May-Jun. 2000.

Agrawal, et al., "On Integrating Catalogs", ACM, May 2001.

Joachims, "A Probabilistic Analysis of the Rocchio Algorithm with TFIDF for Text Categorization", Carnegie Mellon University, Mar. 1998.

Seymour, K., et al., "Learning Hidden Markov Model Structure for Information Extraction", in Machine Learning for Information Extraction, Papers from AAAI Workshop, 1999. Tech Rep. WS-99-11, AAAI Press.

Blum, A. and T. Mitchell, "Combining Labeled and Unlabeled Data with Co-Training", Proceedings of the 1998 Conference on Computational Learning Theory.

Brill, E., "Transformation-Based Error-Driven Learning and Natural Language Processing: A case Study in the Part-of-Speech Tagging", Association for Computational Linguistics, 1995.

Collins, M. & Y. Singer, "Unsupervised Models for Named Entity Classification", AT&T Labs—Research, 1999.

Ghani, R., and R. Jones, "A Comparison of Efficacy and Assumptions of Bootstrapping Algorithms for Training Information Extraction Systems", Accenture Technology Labs, Chicago, IL, School of Computer Science, Carnegie Mellon University, Pittsburg, PA, 2002.

Jones, R., "Learning to Extract Entities from Labeled and Unlabeled Text", School of Computer Science, Carnegie Mellon University, May 2005.

Liu, B., et al., "Opinion Observer: Analyzing and Comparing Opinions on the Web", International World Wide Web Conference Committee (IW3C2) WWW2005, May 10-14, 2005, Chiba, Japan.

Nigam, K, and R. Ghani, "Analyzing the Effectiveness and Applicability of Co-Training", School of Computer Science, Carnegie Mellon University, Pittsburgh PA,2000.

Peng, McCallum, "Accurate Information Extraction from Reserach Papers Using Conditional Random Fields", Department of Computer Science, University of Massachusetts, Amherst MA, Information Processing and Management: an International Journal archive vol. 42 Issue 4, Jul. 2006.

Popescu, A.M., and O. Etzioni, "Extracting Product Features and Opinions from Reviews", Department of Computer Science and engineering, University of Washington, Seattle, WA, HLT '05 Proceedings of the conference on Human Language Technology and Empirical Methods in Natural Language Processing, Association for Computational Linguistics Stroudsburg, PA, USA © 2005.

Hoiem, et al., "Object-Based Image Retrieval Using the Statistical Stsructure of Images", IEEE Conference on Computer Vision and Pattern Recognition, pp. 1-8, 2004.

DeCoste, et al., "Distortion-Invariant Recognition via Jittered Queries", IEEE, pp. 1-6, 2002.

Zhou, Y., "Democratic Co-Learning", 18th IEEE Conference on Tools with Artificial Intelligence, pp. 1-9, 2004.

Zufiria, et al., "Extended Backpropagation for Invariant Pattern Recognition Neural Networks", International Joint Conference on Neural Networks, pp. 2097-2100, 1993.

Licsar, et al., "User-adaptive Hand Gesture Recognition System with Interactive Training", Image and Vision Computing 23, pp. 11-2-1114, 2005.

Becker, D., "Sensei: A Real-Time Recognition, Feedback and Training System for T'ai Chi Gestures", MIT Media Lab Perceptual Computing Gruop Technical Report No. 426, pp. 1-50, 1997.

Probst, K., R. Ghani, "Towards 'Interactive' Active Learning in Multi-view Feature Sets for Information Extraction", Lecture Notes in Computer Science, vol. 4701, Sep. 8, 2007, pp. 683-690, XP019071429.

Probst, et al., "Semi-Supervised Learning of Attribute Value Pairs from Product Descriptions", Proceedings of the 20th International Joint Conferences on Artificial Intelligence (IJCAI '07) Jan. 6, 2007-Jan. 12, 2007, pp. 2838-2843 , XP007906331.

Probst, et al., "Semi-Supervised Learning to Extract Attribute-Value Pairs from Product Descriptions on the Web", Proceedings of the 2006 Workshop on Web Mining (Webmine '06); 17th ESuropean Conference on Machine Learning (ECML '06) & 10th European Conference on Principles and Practice of Knowledge Discovery in Databases (PKDD '06) Sep. 18, 2006, pp. 38-49, XP002504179.

International Search Report and Written Opinion in PCT/GB08/03118 dated Sep. 12, 2008, Form PCT/ISA/210.

International Preliminary 'report on Patentability under Chapter I for PCT/GB2008/003118 dated Mar. 25, 2010.

Jones, et al., "Active Learning for Information Extraction with Multiple View Feature Sets", ECML 2003 Workshop on Adaptive Text Extraction and Mining, 2003.

Lewis, David and William Gale, "A Sequential Algorithm for Training Test Classifiers", 1994, Proceedings of the Seventeenth Annual

(56) References Cited

OTHER PUBLICATIONS

International ACM-SIGIR Conference on Research and Development in Information Retrieval, Springer-Verlag, London, pp. 3-12.

McCallum, A. and K. Nigan, "Employing EM and Pool-Based Active Learning for Text Classification", Proceedings of ICML, 1998.

Muslean, et al., "Active+ Semi-Suprevised Learning = Robust Mutli-View Learning", Proceedings of the ICML, 2002.

Thompson, C., et al., "Active Learning for Natural Language Parsing and Information Extraction", ICML, 1999.

Tong, Simon and Daphne Koller, "Support Vector Machine Active Learning with Applications to Text Classification", Journal of Machine Learning Research, 2001.

Finn A. and N. Kushmerick, "Active Learning Selection Strategies for Information Extraction", ECML—03 Workshop on Adaptive Text Extraction and Mining 2003.

* cited by examiner

PREPROCESSING OF TEXT

CROSS-REFERENCE TO RELATED APPLICATIONS

The instant application is related to co-pending U.S. patent application Ser. Nos. 10/119,665; 11/742,215; 11/742,244 and 11/855,493, the entirety of which applications are incorporated herein by this reference. The instant application is also related to co-pending application filed on even date herewith.

FIELD OF THE INVENTION

The instant disclosure relates generally to statistical machine learning techniques and, in particular, to the preprocessing of text prior to further processing by such statistical machine learning techniques.

BACKGROUND OF THE INVENTION

Classification algorithms, as a subset of statistical machine learning techniques, are well known in the art. A classification task of particular interest is the extraction of attribute-value pairs from natural language documents that describe various products. Various techniques for performing such attribute-value extraction are described in our commonly-assigned, prior U.S. patent application Ser. No. 11/742,215 (the "'215 application") and/or U.S. patent application Ser. No. 11/742,244 (the "'244 application"), the teachings of which prior applications have been incorporated herein by the reference above. As noted therein, retailers have been collecting a growing amount of sales data containing customer information and related transactions. These data warehouses also contain product information that is often very sparse and limited. Treating products as atomic entities hinders the effectiveness of many applications that businesses currently use to analyze transactional data, such applications including product recommendation, demand forecasting, assortment optimization, and assortment comparison. While many retailers have recently realized this and are working towards enriching product databases with attribute-value pairs, the work is currently done completely manually, e.g., through inspection of product descriptions that are available in an internal database or through publicly available channels (such as the World Wide Web), or by looking at the actual product packaging in a retail environment.

While our prior U.S. patent applications describe techniques that beneficially automate these tasks, further improvements are possible. For example, in the sense that classification techniques applied to text determine probabilistic classifications of words and phrases, the reliability of the such classifications can be degraded to the extent that the text includes substantial amounts of extraneous information. Such extraneous text relative to the desired extraction results are similar to noise relative to a desired signal. Thus, it would be desirable to eliminate such extraneous information from text to be analyzed. Furthermore, it is know that certain classification techniques provide advantages or operate more reliably on certain types of data as compared to other classification techniques. Because no one classification technique is perfectly suited for every situation and type of input data, it would be beneficial to leverage the advantages of various techniques in order to arrive at the best possible results.

SUMMARY OF THE INVENTION

The instant disclosure describes techniques for preprocessing a body of text prior to further processing by one or more statistical machine learning techniques, particularly classification techniques applied to the extraction of attributes and values concerning products. To this end, a body of text is first split into a plurality of segments. The body of text may be extracted, while preserving formatting, from one or more documents coming from any of a number of sources. In an embodiment, sentence identification criteria are applied to identify sentences as the plurality of segments. Thereafter, the plurality of segments are clustered to provide a plurality of clusters. One or more of the resulting clusters are then analyzed to identify segments having low relevance to their respective clusters. Such low relevance segments are then removed from their respective clusters and, consequently, from the body of text. As the resulting relevance-filtered body of text no longer includes portions of the body of text containing mostly extraneous information, the reliability of any subsequent statistical machine learning techniques may be improved.

In one embodiment, the body of text, prior to segmentation and clustering as noted above, is passed through a first filter to remove portions of text that are unrelated to a specific subject, e.g., a product. In an embodiment, these portions of text are defined by section boundaries as reflected by formatting preserved in the body of text. In another embodiment, relatively infrequently occurring words are tokenized, i.e., replaced with a unique token, thereby effectively removing them from consideration by any subsequent statistical machine learning techniques. In yet another embodiment, the segmented text, rather then being subjected to the clustering analysis, is additionally passed through a second filter to identify segments including words taken from titles found in the body of text. Thereafter, all segments other than those so identified are removed to provide title-filtered text.

Using the techniques described herein, the reliability of statistical machine learning techniques may be substantially improved.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
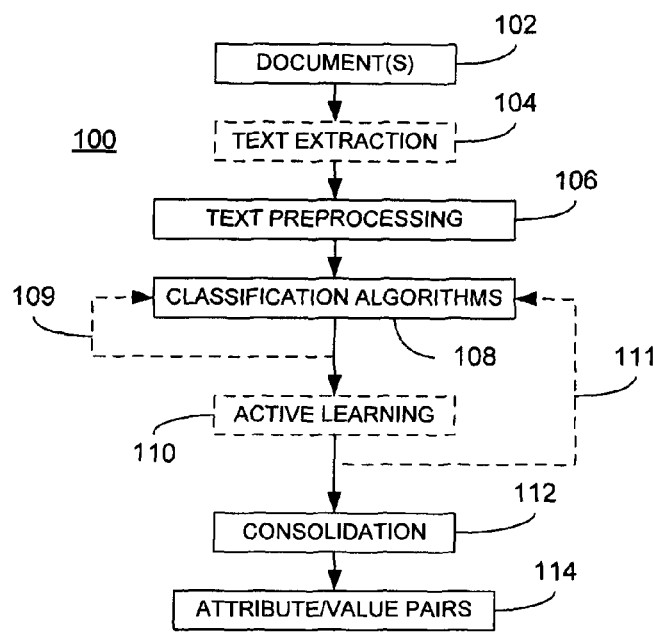
FIG. 1 is a block diagram of a system for processing text in accordance with the instant disclosure.

Referring now to FIG. 1, a system 100 for processing text is illustrated. More particularly, the system 100 is useful for extracting attribute-value pairs from a body of text. Thus, in an embodiment, text from at least one document 102 may be obtained through a text extraction component 104. The document(s) 102 may comprise at least one natural language document that describes one or more products. As used herein, a natural language document comprises any document that at least textually describes a subject using virtually any language syntax normally used by, and intended for consumption by, humans, either orally or in written form, when describing something. As such, a natural language document may be expressed in any language. Furthermore, natural language documents as used herein may comprise unstructured, semi-structured or structured documents as known in the art. In a most general sense, a subject may comprise anything that may be described using a natural language document and, in an embodiment, comprises any object or service that is made available by a supplying entity (e.g., retailers, manufacturers, etc.) for use by interested consumers, i.e., a product. For instance, it is anticipated that the present invention may be beneficially applied to retailers or other commercial enterprises that offer an array of merchandise and/or services for sale. However, the present invention need not be limited to commercial contexts and may be beneficially applied to any domain where it would be advantageous to gain insight into things described in natural language documents.

The text extraction component, if used, may comprise an automated process for collecting the one or more documents 102. For example, in one embodiment, the natural language documents describing products are available via a public communications network such as the World Wide Web in the form of textual content in web pages residing on one or more web servers. Web servers are well known to those having skill in the art. As described in the '215 and the '244 applications, a so-called web crawler (i.e., a computer-executed program that visits remote sites and automatically downloads their contents) may programmed to visit websites of relevant entities (e.g., retailers, manufacturers, etc.) and extract names, Uniform Resource Locators, descriptions, prices and categories of all products available. Such a web crawler may be programmed to automatically extract information or, in a simpler implementation, manually configured to extract specific information. As the web crawler collects suitable information (documents), they are stored in a database for subsequent use. Of course, sources of documents other than web sites, such as internal databases or other non-publicly accessible sources may be equally employed. Further, the documents are not restricted to types typically found in web sites, e.g., HTML pages, but may include other document types such as text files, "MICROSOFT" Office documents, etc. Further still, it is not a requirement of the instant disclosure that natural language documents be collected in this manner. For example, pre-compiled databases of such documents may be equally employed.

Furthermore, in extracting text from a document, the text extraction component may preserve the original or source formatting of the text. That is, certain structural features in the text, e.g., chapter or section boundaries, font differences, headings, etc. may be retained when the text is extracted. As described in greater detail below, such features may be usefully employed when preprocessing the resulting body of text to remove extraneous information.

Regardless of the source, a body of text is provided to the text preprocessing component 106 that operates to remove extraneous information from the body of text. As used herein, extraneous information is any portion of the text that is unlikely to be related to or concern a given subject, e.g., a product. For example, in the case of an electronic consumer device such as a digital camera, a web page may include text describing specific features of the camera, such as resolution, storage type, zoom capabilities, editing features, etc. that would most likely be useful when extracting attributes and corresponding values. Conversely, other text describing, for example, available shipping options for the digital camera, related products, accessories, advertisements, etc. are clearly not related to specific features of the digital camera itself and would be beneficially ignored. Various embodiments of the text preprocessing component 106 are described in greater detail below. A body of text that has been filtered in this manner is subsequently provided, as shown, to a classification component 108 for further processing to extract attributes and values from the body of text.

The classification component 108 treats the problem of extracting (identifying) attributes and values as a classification problem and, therefore, employs one or more classification algorithms for this purpose. As known in the art, classification algorithms deploy learning models that are, in essence, statistical representations of what class or category certain things (such as words) belong to. Thus, such classification algorithms can be applied to a body of text in an attempt to classify individual words within the text into one of several predefined classes. In the case of the instant application, these classes are defined as "attribute", "value" or "neither". Prior to such classification, at least some portion of the words and phrases of the text are, relative to the machine-based learning model underlying the classification algorithm(s), unknown attributes and unknown values. Stated another way, a word is an unknown attribute or value to the extent that that a learning model has not established a likelihood that the word should be, in fact, categorized as an "attribute", "value" or "neither." Words that have been classified in this manner can be thought of as "labeled" data. It should be noted that labeled data may come in the form of individually labeled words or phrases that exist outside the confines of a document structure, e.g., seed attributes and corresponding seed values, as described in greater detail below. In contrast, a document comprises unlabeled data if not all of its constituent words have previously been classified. As described in greater detail below, classification algorithms may be characterized into three different categories: unsupervised, supervised and semi-supervised. The techniques described in the instant application may employ any of these different categories of classification algorithms individually or in combination. As known in the art, unsupervised classification algorithms do not require any initial labeled data as input in order to work, whereas supervised classification algorithms require labeled data in order to train the classifier. Semi-supervised classification algorithms can incorporate both labeled training data and unlabeled data.

As further known in the art, a feature of the classification algorithm(s) employed by the classification component 108 is that the underlying learning models can be updated, i.e., they can "learn." This is illustrated in FIG. 1 by the output 109 of the classification component 108, i.e., previously unknown attributes and values now labeled as attributes and values, being fed back to the classification component. In one embodiment described in greater detail below in which multiple classification algorithms are employed, this means that the labeled attributes and values may be used to update all of the underlying learning models, regardless of which classification algorithm was used to label a specific attribute or value.

In another embodiment, an active learning component 110 is provided in conjunction with the classification component 108. As described, for example, in U.S. patent application Ser. No. 11/855,493 (the "'493 application"), incorporated by reference above and having the same assignee as the instant application, active learning techniques incorporate user input or feedback to improve the accuracy of models developed by learning-capable algorithms. In the case of classification algorithms applied to text, such techniques are capable of determining which words, if designated by a user as being either an attribute or value, would most improve the accuracy of the learning model. Generally, this is done by estimating how much the model can learn from knowing the label of an unlabeled example. Well known techniques for accomplishing this include, but are not limited to, random sample selection or the so-called density or KL-divergence sample selection metrics. It is noted that the instant disclosure is not limited in this regard. In one embodiment, the active learning techniques described in the '493 application may be employed in connection with the system 100. Thus, the one or more corrected attribute and/or corrected value 111 may be used to improve the accuracy of the learning models incorporated into the classification component 108.

The output of the classification component 108 and, if provided, active learning component 110, is a plurality of labeled attributes and values. However, this does not complete the extract process because some words that are tagged with the same label should be merged to form an attribute or a value phrase. Additionally, the system must establish links between attributes (or attribute phrases) and their corresponding values (or value phrases), so as to form attribute-value pairs. To this end, a consolidation component 112 is provided. In an embodiment, the consolidation component 112 practices those techniques described in the '215 and '244 applications for identifying attribute phrases and/or value phrases and subsequently linking attributes (and attribute phrases) to corresponding values (and value phrases). The resulting attribute/value pairs 114 are then provided as the output of the system 100.

Figure 2:
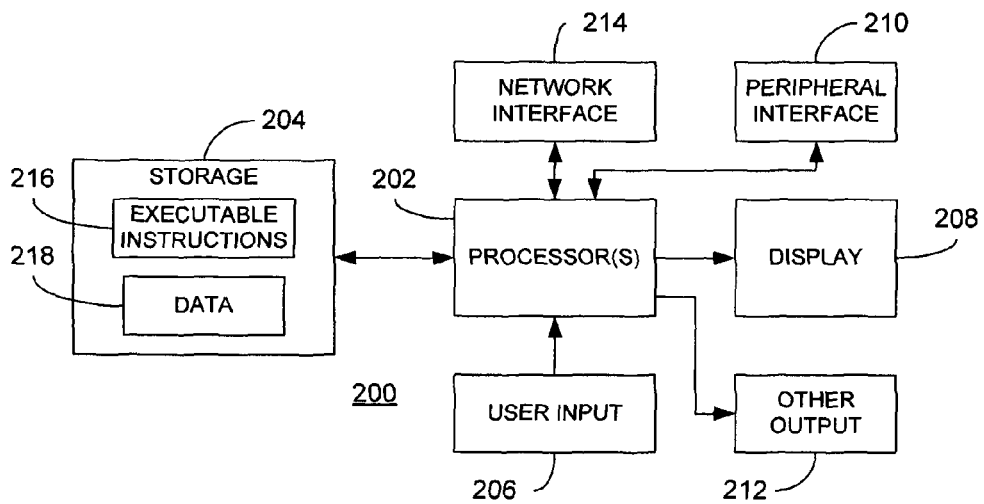
FIG. 2 is a block diagram of a processing device that may be used to implement various embodiments in accordance with the instant disclosure.

In an embodiment, the system 100 illustrated in FIG. 1 is implemented using one or more suitably programmed processing devices, such as the processing device 200 illustrated in FIG. 2. The device 200 may be used to implement, for example, one or more components of the system 100, as described in greater detail below with reference to FIGS. 3-6. Regardless, the device 200 comprises a processor 202 coupled to a storage component 204. The storage component 204, in turn, comprises stored executable instructions 216 and data 218. In an embodiment, the processor 202 may comprise one or more processing devices such as a microprocessor, microcontroller, digital signal processor, or combinations thereof capable of executing the stored instructions 216 and operating upon the stored data 218. Likewise, the storage component 204 may comprise one or more devices such as volatile or nonvolatile memory including but not limited to random access memory (RAM) or read only memory (ROM). Further still, the storage component 204 may be embodied in a variety of forms, such as a hard drive, optical disc drive, floppy disc drive, etc. Processor and storage arrangements of the types illustrated in FIG. 2 are well known to those having ordinary skill in the art, for example, in the form of laptop, desktop or server computers. In one embodiment, the processing techniques described herein are implemented as a combination of executable instructions and data within the storage component 204.

As shown, the device 200 may comprise one or more user input devices 206, a display 208, a peripheral interface 210, other output devices 212 and a network interface 214 in communication with the processor 202. The user input device 206 may comprise any mechanism for providing user input to the processor 202. For example, the user input device 206 may comprise a keyboard, a mouse, a touch screen, microphone and suitable voice recognition application or any other means whereby a user of the device 200 may provide input data to the processor 202. The display 208, may comprise any conventional display mechanism such as a cathode ray tube (CRT), flat panel display, or any other display mechanism known to those having ordinary skill in the art. In an embodiment, the display 208, in conjunction with suitable stored instructions 216, may be used to implement a graphical user interface. Implementation of a graphical user interface in this manner is well known to those having ordinary skill in the art. The peripheral interface 210 may include the hardware, firmware and/or software necessary for communication with various peripheral devices, such as media drives (e.g., magnetic disk or optical disk drives), other processing devices or any other input source used in connection with the instant techniques. Likewise, the other output device(s) 212 may optionally comprise similar media drive mechanisms, other processing devices or other output destinations capable of providing information to a user of the device 200, such as speakers, LEDs, tactile outputs, etc. Finally, the network interface 214 may comprise hardware, firmware and/or software that allows the processor 202 to communicate with other devices via wired or wireless networks, whether local or wide area, private or public, as known in the art. For example, such networks may include the World Wide Web or Internet, or private enterprise networks, as known in the art.

While the device 200 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Further still, other implementations of the device 200 may include a greater or lesser number of components than those illustrated. Once again, those of ordinary skill in the art will appreciate the wide number of variations that may be used is this manner.

Figure 3:
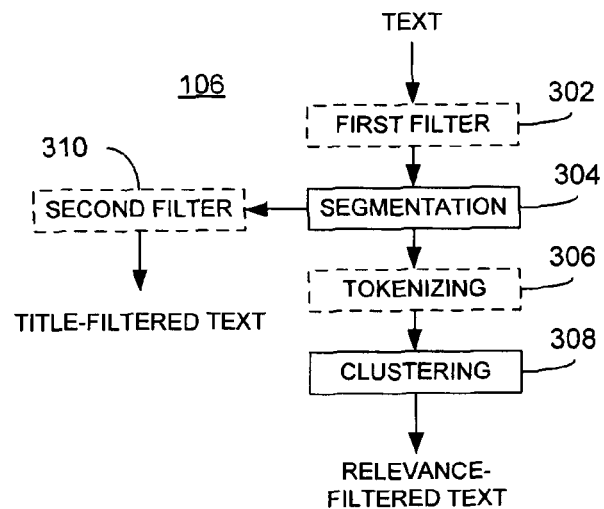
FIG. 3 is a block diagram illustrating the text preprocessing component of FIG. 1 in greater detail.

Referring now to FIG. 3, a block diagram of the text preprocessing component of FIG. 1 is illustrated in greater detail. In particular, the text preprocessing component 106 comprises a segmentation component 304 operatively coupled to a clustering component 308. As indicated by the dashed lines, the text preprocessing component 106 may optionally comprise a first filter component 302 operatively coupled to the segmentation component 304, a tokenizing component 306 operatively coupled to the segmentation component 304 and the clustering component 308 and/or a second filter component 310 operatively coupled to the segmentation component 304.

The segmentation component 304 takes as input a body of text and divides or segments the body of text into a plurality of segments. In an embodiment, sentence identification criteria may be applied to the body of text to identify sentences therein, with each identified sentence then being provided as a separate segment. For example, the sentence identification criteria may comprise searching the body of text for periods (.) followed by zero or more spaces and a capital letter in a subsequent word. When these conditions are met, the text prior to the period may be designated as the end of a sentence and the word beginning with the capital letter may be designated as the beginning of another sentence. Other sentence identification criteria may be equally employed for this purpose. In those instances where such sentence boundaries are not present, the body of text may be broken into lines of text with each line comprising no more than a threshold number of contiguous words. In this case, each line of text is then provided as a separate segment. Each segment may be separately stored in a suitable storage device or identified within the body of text (again, stored in a suitable storage device) by suitable indicia, e.g., markup tags or the like.

Regardless, the resulting segments are then provided to the clustering component 308, which may implement a clustering algorithm used to group the plurality of segments into a relatively small number of clusters. For example, between 10 and 25 clusters may be a useful, but manageable, number of clusters in many applications. In an embodiment, the clustering component 308 implements an unsupervised clustering algorithm such as the well-known k-means clustering techniques as described, for example, in "K-means Clustering via Principal Component Analysis", Chris Ding and Xiaofeng He, Proc. of Int'l Conf. Machine Learning (ICML 2004), pp 225-232, July 2004, the teachings of which are incorporated herein by this reference. Alternatively, the well-known expectation-maximization (EM) algorithm may also be employed for this purpose as taught, for example, in The EM Algorithm and Extensions, Geoffrey McLachlan and Thriyambakam Krishnan, John Wiley & Sons, 1996, the teachings of which reference are likewise incorporated herein by this reference. As known in the art, clustering techniques use various metrics to determine whether distinct items (in this case, segments) are sufficiently related to each other to justify grouping them together. This process may be repeated until each of the plurality of segments is associated with (i.e., included in) one of the plurality of clusters. For example, the number of words in common between separate segments may be used to determine how related two segments are. Those having skill in the art will appreciate that the particular metric used to establish clusters will depend on the particular cluster technique employed.

As further known in the art, the plurality of clusters may be refined by eliminating, from individual clusters, those segments having lowest relevance to their corresponding clusters. In an embodiment, clusters that have representative words that are irrelevant (relative to the subject, i.e., product, under consideration) are removed from consideration. For example, a cluster with a sufficient sampling (selected as a design consideration) of representative words such as "shipping", "free", "UPS", "FEDEX" or the like indicate that the various segments within that cluster are mainly focused on shipping terms and options, rather than the product itself, and the cluster is therefore eliminated. In this same vein, segments within a specific cluster may be eliminated from that cluster if such segments include a significant number (again selected as a design consideration) of irrelevant words. Those segments remaining after the clustering component 308 has completed these operations correspond to the that portion of the text deemed most relevant to the subject under consideration, i.e., a particular product. This is illustrated in FIG. 3 as relevance-filtered text output by the clustering component 308.

As noted above, other optional components may be employed to further refine the quality of the text preprocessing operations. The first filter component 302 performs a first pass relevance filtering of the body of text to eliminate not just specific clusters or segments (as per the clustering component 308), but entire portions of the body of text deemed to be unrelated to a given subject such as a particular product. To this end, in an embodiment, section boundaries as reflected in the formatting found in the body of text may be employed. As noted above, when the body of text is extracted from one or more documents, it is desirable to preserve the original structural and formatting characteristics. Using these characteristics, it may be possible to delineate specific sections within the body of text. For example, explicitly indicated section breaks in a document may be used to clearly distinguish between separate sections of that document. In another embodiment, headings within a document may be identified (using known techniques) such that the text between headings constitutes separate sections. Further still, blocks of text having different formatting (e.g., font, size, etc.) can be identified and different sections inferred thereby. With such sections identified, the first filter component 302 then determines whether each section is sufficiently related to the subject under consideration. Subsequently, once clusters have been created as noted above, the existence of contiguous sentences from a given section in a cluster to be eliminated can be used to not only remove the cluster, but also the section. In this manner, where the first filter component 302 is provided, rather than operating directly upon the body of text, the segmentation component 304 instead operates on a filtered body of text (i.e., in which various sections have been identified) as provided by the first filter component 302.

As further shown, a tokenizing component 306 may be interposed between the segmenting component 304 and the clustering component 308. In an embodiment, the tokenizing component 306 may replace relatively infrequent words in the body of text (e.g., words occurring less than ten times throughout the entire body of text) with a unique token such as "rare_word" or the like. The intuition behind such tokenization is that it neutralizes words that would otherwise be of relatively little use to a statistical learning model by making them generic.

Finally, the second filter component 310 may be provided to provide title-filtered text as a separate data set apart from the relevance-filtered text. In this instance, the intuition is that titles often contain a series of keywords that are values for a set of attributes for a given subject, and would therefore provide a useful basis for extracting values. Thus, in an embodiment, the second filter component 310 analyzes each segment to identify those segments that include at least one word found in one or more titles found in the body of text. In an embodiment, this may be achieved by using patterns that are specific to data sources to identify titles. For example, text separated by two line or paragraph breaks, or text at the beginning of a document having bold formatting may be identified as titles. Still other techniques will be apparent to those having skill in the art. Once titles are identified by the second filter 310, the words in the title (with the exception of stop words) can be used as the basis for automated searches of the segments. The title-filtered text comprises that portion of the body of text corresponding to those segments thus identified, with the text of all other segments being disregarded.

Figure 4:
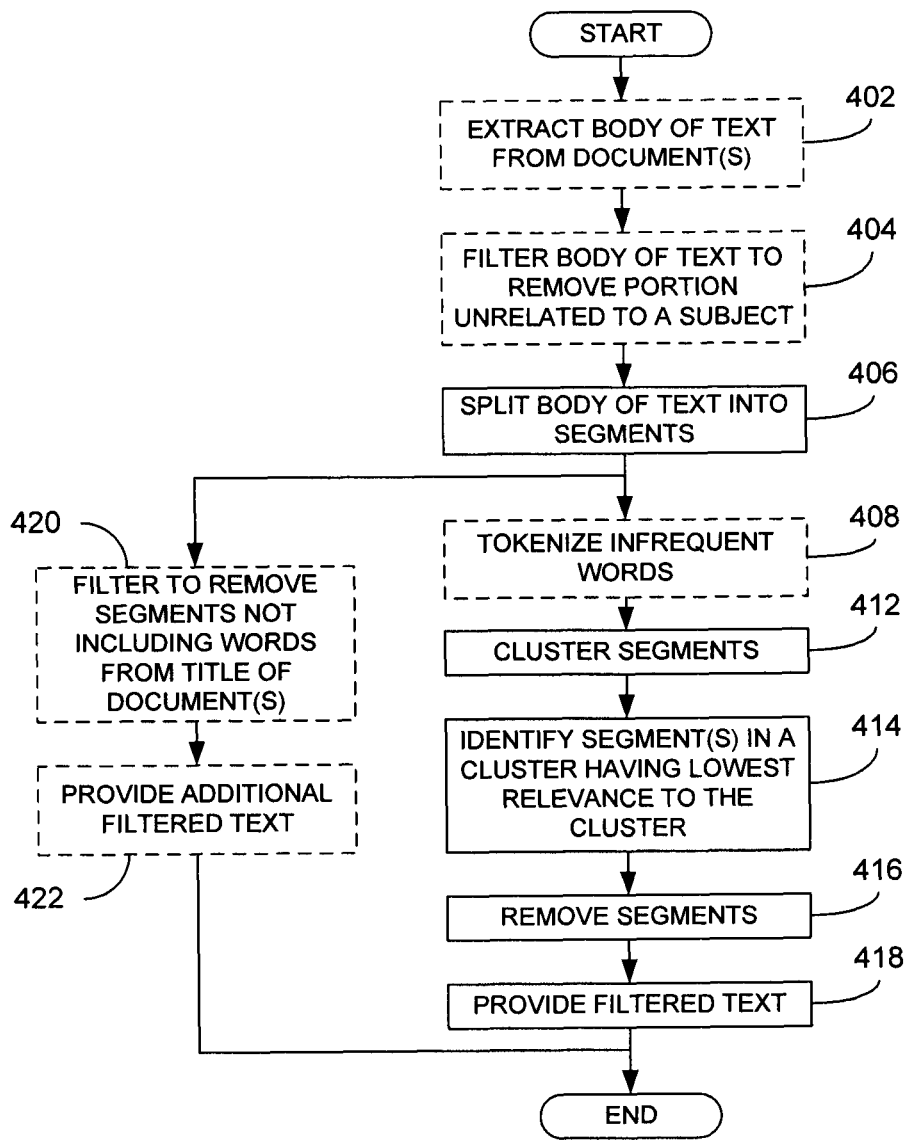
FIG. 4, is a flow chart illustrating text preprocessing operations in accordance with various embodiments of the instant disclosure.

Referring now to FIG. 4, a flow chart illustrating text preprocessing operations is provided. Thus, beginning at block 402, a body of text may be optionally extracted from one or more documents. Again, the structural and formatting characteristics are preferably preserved in the extracted text. Thereafter, at block 404, processing may optionally continue where at least one portion of the body of text unrelated to a subject is removed as in the case, described above, of removing sections of text. In this vein, it is understood that the actual removal of sections of text is performed in conjunction with the clustering process as noted above; however, for purposes of illustration, the filtering processing of block 404 is illustrated prior to the cluster processing to reflect the fact that the identification of sections within the text effectuates the subsequent removal (i.e., filtering) of portions of the text. Regardless, processing continues at block 406 where the body of text (or filtered body of text) is split into a plurality of segments, for example according to individual sentences.

The resulting plurality of segments may then follow either or both of the two illustrated paths. Along the first, the plurality of segments may be subject to tokenization of infrequent words at block 408. The plurality of segments (whether tokenized or not) are thereafter clustered at block 412 as described above. Each cluster is then examined, at block 414, to identify segments within a cluster having lowest relevance to the cluster, or clusters having low-relevance as a whole. Thereafter, at block 416, such low-relevance segments are removed from their respective clusters, or such clusters are eliminated entirely. The segments remaining in the final clusters correspond to those portions of the body of text provided, at block 418, as the relevance-filtered text. Alternatively, or additionally, processing may continue following segmentation at block 420 where segments not including words from one or more titles associated with the body of text are disregarded such that the remaining segments are provided as additional, title-filtered text at block 422.

Figure 5:
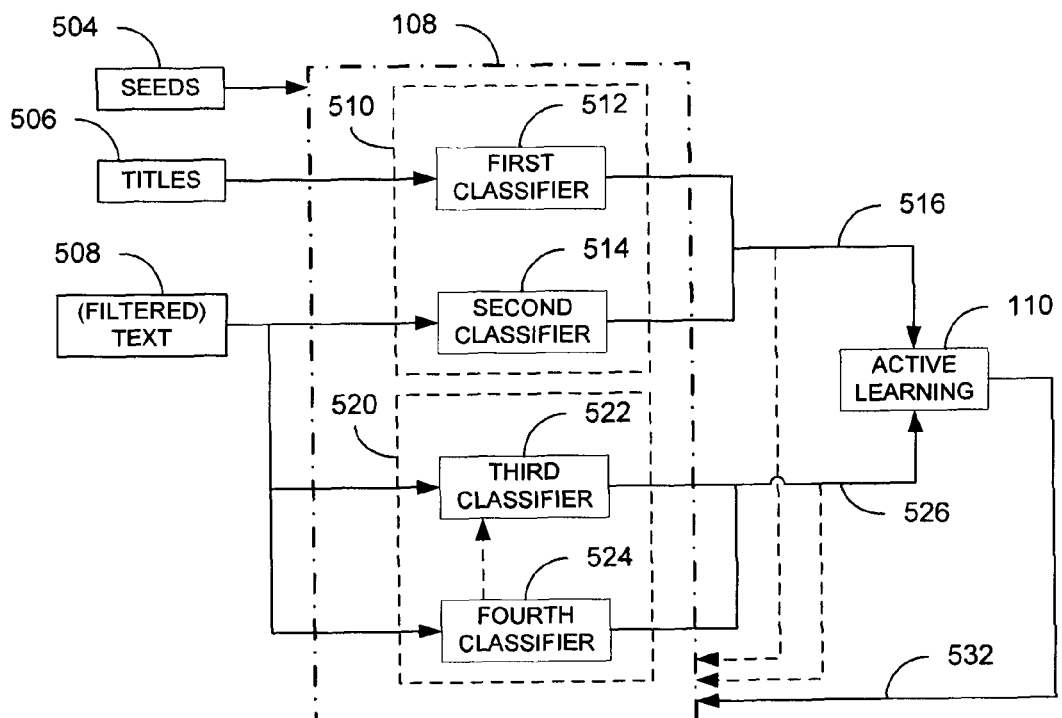
FIG. 5 is a block diagram illustrating the classification component of FIG. 1 in greater detail.

As described above, the instant disclosure provides useful techniques for preprocessing bodies of text to improve performance of statistical machine learning techniques. Additional improvements to the classification component 108 are described below relative to FIGS. 5 and 6. Referring now to FIG. 5, a block diagram is provided illustrating the classification component of FIG. 1 in greater detail. In particular, the classification component 108 comprises a first classification sub-component 510 and a second classification sub-component 520. The first classification sub-component 510 further comprises at least one classifier. Specifically, in the illustrated embodiment, the first classification sub-component 310 comprises a first classifier 512 and a second classifier 514. Likewise, the second classification sub-component 510 comprises as least one classifier. In the illustrated embodiment, the second classification sub-component 510 comprises a third classifier 522 and a further classifier 524. As described below, in an embodiment, the various classification sub-components 510, 520 can operate on different portions of the body of text. For example, the first classification sub-component 510 can operate on a first portion of the body of text and the second classification sub-component 520 can operate on a second portion of the body of text, where the first and second portions of the body of text are mutually exclusive of each other. Conversely, the classification sub-components may also works on portions of the body of text in which at least some of the text is commonly operated upon by both of the classification sub-components.

In an embodiment, the first and second classifiers 512, 514 used in the first classification sub-component 510 are exclusively supervised classifiers, whereas the third and fourth classifiers 522, 524 used in the second classification sub-component 520 may comprise any combination of semi-supervised and/or unsupervised classifiers. For example, the third classifier 522 may implement a semi-supervised classification technique, whereas the fourth classifier 524 may implement an unsupervised classification technique. As noted above, unsupervised classification algorithms do not require any labeled data as input in order to work, whereas supervised classification algorithms require labeled data in order to train the classifier and semi-supervised classification algorithms can incorporate both labeled training data and unlabeled data. As further known in the art, the various supervised and semi-supervised classifiers 512, 514, 522 may use seed attributes and/or values 504, also referred to as labeled training data, to initially train their underlying learning models. For example, such seeds 504 may be provided from manually labeled training data such as lists of domain-specific values including colors, materials, countries and/or units of measure.

As noted previously, titles often contain values for one or more attributes. Thus, in the illustrated embodiment, the first classifier 512 may comprise the so-called winnow algorithm and may be configured to operate exclusively on titles 506 as shown. Other algorithms, such as the CRF and/or HMM sequential classification algorithms may be used, additionally or alternatively, for this purpose. In this fashion, the first classifier 512 extracts (labels) at least a portion of previously unknown values from titles based on known attributes taken, for example, from the labeled training data 504. In a similar vein, the second classifier 514 may employ the winnow or perceptron algorithms to label at least a portion of unknown values in the body of text 508 (which may be preprocessed as described above) based on a relatively large number of known attributes from labeled training data 504. Based on these classifiers 512, 514, the first classification sub-component 510 provides as a first set of values 516 a first portion of the plurality of unknown values from the body of text 508 and titles 506.

In an embodiment, the third classifier 522 may be used to label unknown attributes and values. To this end, the third classifier 522 may employ the so-called co-EM classification algorithm based on a naïve Bayes classifier, as described in greater detail in the '215 and '244 applications. As described therein, the labeled training data 504 is used to train the underlying naïve Bayes classifier, i.e., to label attributes and values based on the labeled training data. In turn, the co-EM classification algorithm is able to extend the results of the naïve Bayes classifier to label unknown attributes and values in the body of text 508. In this sense, together, co-EM with naïve Bayes is a semi-supervised classification technique.

As further shown, the second classification sub-component 520 in the illustrated embodiment also includes the fourth classifier 524, which comprises an unsupervised classifier. In an embodiment, the fourth classifier 524 operates to calculate the likelihood that a given word is an attribute based on the cumulative mutual information (CMI) metric. For example, as described in the '215 and '244 applications, the CMI metric is grounded in the assumption that attributes are likely to co-occur with a relatively small number of other words, i.e., likely values for the attribute. Thus, the CMI-based metric described in the '215 and '244 applications identifies a relative small number of words (attributes) that co-occur with not too many and not too few other words (values). In this manner, relative high quality (in terms of accuracy) attributes and values may be identified. As shown, the attributes and values identified in this manner may be used as further seed attributes and values for the third classifier 522. Thus, the second classification sub-component 520 results in a portion of the unknown attributes in the body of text being labeled as a set of attributes and a second portion of the unknown values being labeled as a second set of values. The set of attributes and second set of values thus identified are collectively illustrated by the path having reference numeral 526 in FIG. 5. Note that the second portion of the unknown values (giving rise to the second set of values 526) may overlap with the first portion of the unknown values (giving rise to the first set of values 516) to the extent that the second classifier 514 operates independently of the second classification sub-component 520 and, more specifically, the third and fourth classifiers 522, 524.

As illustrated by the dotted lines, the first set of values 516 as well as the second set of value and the set of attributes 526 may be used to update the leaning models implemented by the various supervised and semi-supervised classifiers 512, 514, 522. In this manner, the particular advantages provided by the separate types of classifiers 512, 514, 522 may be used to improve the performance of all such classifiers. Alternatively or additionally, the active learning component 110 may also be employed to operate upon the first set of values 516 as well as the second set of value and the set of attributes 526 to provide one or more corrected attributes and/or corrected values 532. Once again, the corrected attributes and/or corrected value 532 may then be used as input to update the leaning models implemented by the various supervised and semi-supervised classifiers 512, 514, 522.

Figure 6:
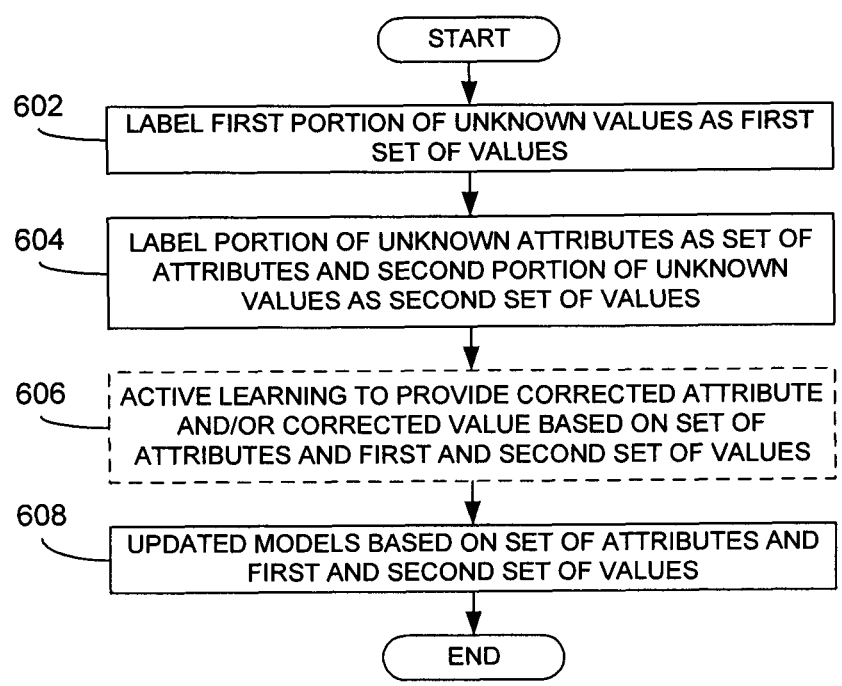
FIG. 6 is a flow chart illustrating classification operations in accordance with various embodiments of the instant disclosure.

Referring now to FIG. 6, a flow chart illustrating classification processing in accordance with the instant disclosure is provided. As shown, the process begins at block 602 where a first portion of unknown values in the body of text are labeled as a first set of values. As described above, this may be performed by the first classification sub-component 510 via the second classifier 514, in conjunction with the further processing of the first classifier 512. Likewise, at block 604, a portion of the unknown attributes in the body of text are labeled as a set of attributes and a second portion of the unknown values are labeled as a second set of values. As described above, this may be performed by the second classification sub-component 520 via the third and fourth classifiers 522, 524. Using the active learning component 110, active learning techniques may be optionally applied to the set of attributes and the first and second set of values, at block 606, to provide one or more corrected attributes and/or corrected values. Regardless, processing continues where learning models implemented by the various classification components are updated at least based upon the set of attributes and the first and second set of values. Where active learning is employed, this update processing may include the one or more corrected attributes and/or corrected values.

As described above, the instant disclosure sets forth various techniques for improving performance of statistical machine learning techniques. Thus, in one embodiment, pre-processing of a body of text is provided whereby extraneous information, unrelated to a given subject, is removed from the body of text based in part upon relevance determinations. In another embodiment, a suite of classification algorithms is employed wherein the collective performance of the suite of algorithms is improved by using the results of each algorithm to update the underlying learning models of each. For at least these reasons, the above-described techniques represent an advancement over prior art teachings.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method comprising:
   receiving, by a device, a document;
   determining, by the device, a plurality of topics associated with the document;
      each of the plurality of topics being associated with text,
   determining, by the device, one or more desired topics of the plurality of topics;
   filtering, by the device, a first portion of text from the document without filtering a second portion of text from the document,
      the second portion of text being associated with the one or more desired topics,
      the first portion of text not being associated with the one or more desired topics,
      the first portion of text being removed from the document, and
      the second portion of text being different than the first portion of text;
   splitting, by the device, the second portion of text into a plurality of segments;
   clustering, by the device, each of the plurality of segments into one or more clusters of a plurality of clusters,
      each cluster, of the plurality of clusters, including at least one of the plurality of segments, and
      each cluster, of the plurality of clusters, being associated with the one or more desired topics;
   identifying, by the device, at least one segment, of the plurality of segments, having low relevance to a cluster, of the plurality of clusters, that includes the at least one segment; and
   removing, by the device, the at least one segment from the cluster.

2. The method of claim 1, further comprising:
   extracting the first portion of text and the second portion of text from the document.

3. The method of claim 1, further comprising:
   identifying one or more headings in the document;
   associating the first portion of text with a first heading of the one or more headings; and
   filtering the first portion of text based on the association.

4. The method of claim 1, where, when splitting the second portion of text into the plurality of segments, the method includes:
   applying sentence identification criteria to the text to identify sentences in the text; and
   associating each identified sentence with a segment of the plurality of segments.

5. The method of claim 1, further comprising:
   tokenizing one or more infrequent words in one or more of the plurality of segments to replace the one or more infrequent words with a token,
   where at least one of the plurality of clusters includes a segment with at least one token.

6. The method of claim 1, further comprising:
   identifying one or more titles in the text;
   identifying at least one segment of the plurality of segments that does not include at least one word from the identified one or more titles; and
   removing the identified at least one segment from the text.

7. An apparatus comprising:
   a memory including instructions; and
   a processor to execute the instructions to:
      receive a document;
      determine a plurality of topics associated with the document;
         each of the plurality of topics being associated with text,
      determine one or more desired topics of the plurality of topics;
      filter a first portion of text from the document without filtering a second portion of text from the document,
         the second portion of text being associated with the one or more desired topics,
         the first portion of text not being associated with the one or more desired topics,
         the first portion of text being removed from the document, and
         the second portion of text being different than the first portion of text;

split the second portion of text into a plurality of segments;
cluster each of the plurality of segments into one or more clusters of a plurality of clusters,
 each cluster, of the plurality of clusters, including at least one of the plurality of segments, and
 each cluster, of the plurality of clusters, being associated with the one or more desired topics;
identify at least one segment, of the plurality of segments, having low relevance to a cluster, of the plurality of clusters, that includes the at least one segment; and
remove the at least one segment from the cluster.

8. The apparatus of claim 7, where the processor is further to:
extract the first portion of text and the second portion of text from the document.

9. The apparatus of claim 7, where the processor is further to:
identify one or more headings in the document;
associate the first portion of text with a first heading of the one or more headings; and
filter the first portion of text based on the association.

10. The apparatus of claim 7, where, when splitting the second portion of text into the plurality of segments, the processor is further to:
apply sentence identification criteria to the text to identify sentences in the text; and
associate each identified sentence with a segment of the plurality of segments.

11. The apparatus of claim 7, where the processor is further to:
tokenize one or more infrequent words in one or more of the plurality of segments to replace the one or more infrequent words with a token,
where at least one of the plurality of clusters includes a segment with at least one token.

12. The apparatus of claim 7, where the processor is further to:
identify one or more titles in the text;
identify at least one segment of the plurality of segments that does not include at least one word from the identified one or more titles; and
remove the identified at least one segment from the text.

13. A non-transitory computer-readable medium storing instructions, the instructions comprising:
one or more instructions which, when executed by at least one processor, cause the at least one processor to:
 receive a document;
 determine a plurality of topics associated with the document;
  each of the plurality of topics being associated with text,
 determine one or more desired topics of the plurality of topics;
 filter a first portion of text from the document without filtering a second portion of text from the document,
  the second portion of text being associated with the one or more desired topics,
  the first portion of text not being associated with the one or more desired topics,
  the first portion of text being removed from the document, and
  the second portion of text being different than the first portion of text;
 split the second portion of text into a plurality of segments;
 cluster each of the plurality of segments into one or more clusters of a plurality of clusters,
  each cluster, of the plurality of clusters, including at least one of the plurality of segments, and
  each cluster, of the plurality of clusters, being associated with the one or more desired topics;
 identify at least one segment, of the plurality of segments, having low relevance to a cluster, of the plurality of clusters, that includes the at least one segment; and
 remove the at least one segment from the cluster.

14. The computer-readable medium of claim 13, where the instructions further comprise:
one or more instructions to extract the first portion of text and the second portion of text from the document.

15. The computer-readable medium of claim 13, where the instructions further comprise:
one or more instructions to identify one or more headings in the document;
one or more instructions to associate the first portion of text with a first heading of the one or more headings; and
one or more instructions to filter the first portion of text based on the association.

16. The computer-readable medium of claim 13, where the one or more instructions to split the second portion of text into the plurality of segments include:
one or more instructions to apply sentence identification criteria to the text to identify sentences in the text; and
one or more instructions to associate each identified sentence with a segment of the plurality of segments.

17. The computer-readable medium of claim 13, where the instructions further comprise:
one or more instructions to tokenize infrequent words in one or more of the plurality of segments to replace the one or more infrequent words with a token,
where at least one of the plurality of clusters includes a segment with at least one token.

18. The computer-readable medium of claim 13, where the instructions further comprise:
one or more instructions to identify one or more titles in the text;
one or more instructions to identify at least one segment of the plurality of segments that does not include at least one word from the identified one or more titles; and
one or more instructions to remove the identified at least one segment from the text.

19. The method of claim 6, where, when identifying the one or more titles in the text, the method includes:
identifying at least one of:
 a paragraph break, or
 text including a bold formatting; and
identifying the one or more titles in the text based on the identified at least one of the paragraph break or text including the bold formatting.

20. The apparatus of claim 12, where the processor, when identifying the one or more titles in the text, is further to:
identify at least one of:
 a paragraph break, or
 text including a bold formatting; and
identify the one or more titles in the text based on the identified at least one of the paragraph break or text including the bold formatting.

21. The computer-readable medium of claim 18, where the one or more instructions to identify one or more titles in the text include:

one or more instructions to identify at least one of:
   a paragraph break, or
   text including a bold formatting; and
one or more instructions to identify the one or more titles in the text based on the identified at least one of the paragraph break or text including the bold formatting.

* * * * *